United States Patent [19]

McCammon

[11] 4,250,442
[45] Feb. 10, 1981

[54] STABLE SYNCHRONOUS DRIVE SYSTEM FOR GYROSCOPE ROTOR

[75] Inventor: William W. McCammon, Merrick, N.Y.

[73] Assignee: Sperry Corporation, New York, N.Y.

[21] Appl. No.: 81,728

[22] Filed: Oct. 4, 1979

[51] Int. Cl.³ .......................... H02P 1/46; H02P 1/52; H02P 5/34
[52] U.S. Cl. .................................. 318/723; 318/722; 318/808; 318/812
[58] Field of Search ............... 318/720, 721, 722, 723, 318/807, 808, 812

[56] References Cited

U.S. PATENT DOCUMENTS

| | | | |
|---|---|---|---|
| 3,165,686 | 1/1965 | Macdonald | 318/723 X |
| 3,280,399 | 10/1966 | Kreinberg | 318/722 OR |
| 3,453,515 | 7/1969 | Millois et al. | 318/807 X |
| 3,571,681 | 3/1971 | Burns | 318/807 |
| 3,859,585 | 1/1975 | Meier | 318/721 X |
| 4,048,554 | 9/1977 | Stich | 318/808 X |
| 4,123,692 | 10/1978 | Gilmore et al. | 318/722 X |

*Primary Examiner*—Gene Z. Rubinson
*Assistant Examiner*—Richard M. Moose
*Attorney, Agent, or Firm*—Howard P. Terry

[57] ABSTRACT

Control systems for starting and synchronously driving gyroscope rotors establish magnetic polarization of the rotor ring prior to start-up and then accelerating the magnetic field vector as the rotor accelerates to its normal operating speed.

9 Claims, 12 Drawing Figures

STABLE SYNCHRONOUS DRIVE SYSTEM FOR GYROSCOPE ROTOR

BACKGROUND OF THE INVENTION

1. Field of the Invention

The present invention pertains to the field of gyroscopic devices and more particularly concerns stable synchronous systems for driving the rotors of gyroscope spin motors.

2. Description of the Prior Art

Gyroscopes typically use hysteresis synchronous motors so that the rotor may be driven at a known constant speed. Such operation is desired where an output of the gyroscope is a precise calibrated output only for a given constant or known rate of rotation of the gyroscope rotor. However, the standard hysteresis synchronous motor has an inherent property of random synchronization. The seat of this property lies in the fact that each time the motor is started and subsequently synchronizes, the permanent magnetic poles of the hysteresis ring of the motor are reformed or relocated. Each time they are newly generated, their locations randomly shift and so do their magnitudes, all apparently under the influence of the revolving magnetomotive force in the rotor ring. Thus, the magnetic axis as established in the rotor in its last preceding operating period will normally not be in alignment with the revolving field when the motor is subsequently started, so that a new synchronizing point accordingly materializes. The foregoing random readjustment can induce undesired differences in the magnitude and phase of motor induced vibrations and can alter the magnetic coupling between the spin motor stator and the gyroscope rotor. The effects of the latter problems are of special concern for flexure-supported free rotor gyroscopes wherein the gyroscope rotor is articulated with respect to the spin motor stator. In precision gyrocompasses, they are also a special problem, since the accuracy of computation of navigational and surveying computers employed in association with the gyrocompass is also affected adversely by the same uncertainties.

It is understood that one attempt has been made, but with minor success, to overcome the foregoing problem by periodic high frequency interruption of the spin motor supply to use an averaging effect of many rapid random resynchronizations. The noise introduced by the method is detrimental to the achievement of low random drift; also, rotor slip caused by the periodic non-synchronous operation of the gyroscope rotor induces uncertainty in the rotor speed, an uncertainty that cannot be tolerated in calibrated inertial systems. Another suggested method was to use a periodic advance or retreat of the spin motor magnetic field which causes remagnetization of the hysteresis ring without the periodic rotor speed change caused by the power interruption technique. Although there appears to be a beneficial averaging feature also in this latter technique, it does not overcome rotor speed uncertainty and it is therefore not suited for use in precision applications.

These prior art concepts, while dealing generally with the problems of volatile poling of the rotor ring, do not in themselves solve the problems solved by the present invention, nor does the concept found in the H.K. Voigt U.S. patent application Ser. No. 20,758 for a "Stable Subsynchronous Drive System for Gyroscope Rotor", filed Mar. 15, 1979 and assigned to Sperry Corporation. The Voigt concept provides precise control over the rotor spin rate, the rotor being servo operated subsynchronously whereby a reference frequency generated by a spin frequency reference generator is synchronized with a precisely stable frequency standard, assuring the maintenance of constant rotor speed and permitting precisely calibrated gyroscope torquing. The gyroscope motor rotor is thus spun at a subsynchronous frequency so that the poles in the hysteresis ring are constantly rotating about the ring and their effect on average magnetic bias is averaged substantially to zero. Further, the drive motor is operated with good efficiency because its excitation is automatically and closely adjusted to be just sufficient to generate only the necessary motor torque for subsynchronous operation. While of value in many situations it is, however, of most interest where it is necessary for separate reasons to equip the gyroscope itself with a two-phase reference spin generator, a procedure not always practical in view of weight, size, and cost considerations.

Furthermore, the prior art in general does not adequately satisfy the need for a high efficiency synchronous rotor drive for field operation with low current drive from a readily transportable battery. To produce minimum battery drain requires that minimum energy be expended in bringing the gyroscope rotor up to its synchronous operating speed from stand-still and also that minimum power is used in steady state operation. The usual practice has not been found to be suitably efficient, since it is merely to apply a constant frequency, constant voltage level to the motor considerably greater in amplitude than the normal operating level until the rotor reaches its operating speed, and then to reduce the voltage level to a predetermined lower operating level.

SUMMARY OF THE INVENTION

The present invention concerns apparatus for accurately driving rotors of precision gyroscopes, such as those on which the quality of operation of inertial navigation or surveying equipment depends, and including, for example, operation of hysteresis motor driven rotors in gyrocompasses and in flexure mounted rate of turn or other inertial gyroscopes. According to the present invention, run-up energy and running power is saved by establishing a magnetic polarization of the rotor ring prior to start-up and then linearly or otherwise accelerating the magnetic field vector from stand-still to normal running speed. In this manner, the initial polarization of the rotor ring is maintained as the rotor continues to follow the magnetic field vector in normal running with a slight slip angle between the rotor poles and stator field poles.

DESCRIPTION OF THE PREFERRED EMBODIMENTS

Figure 1:
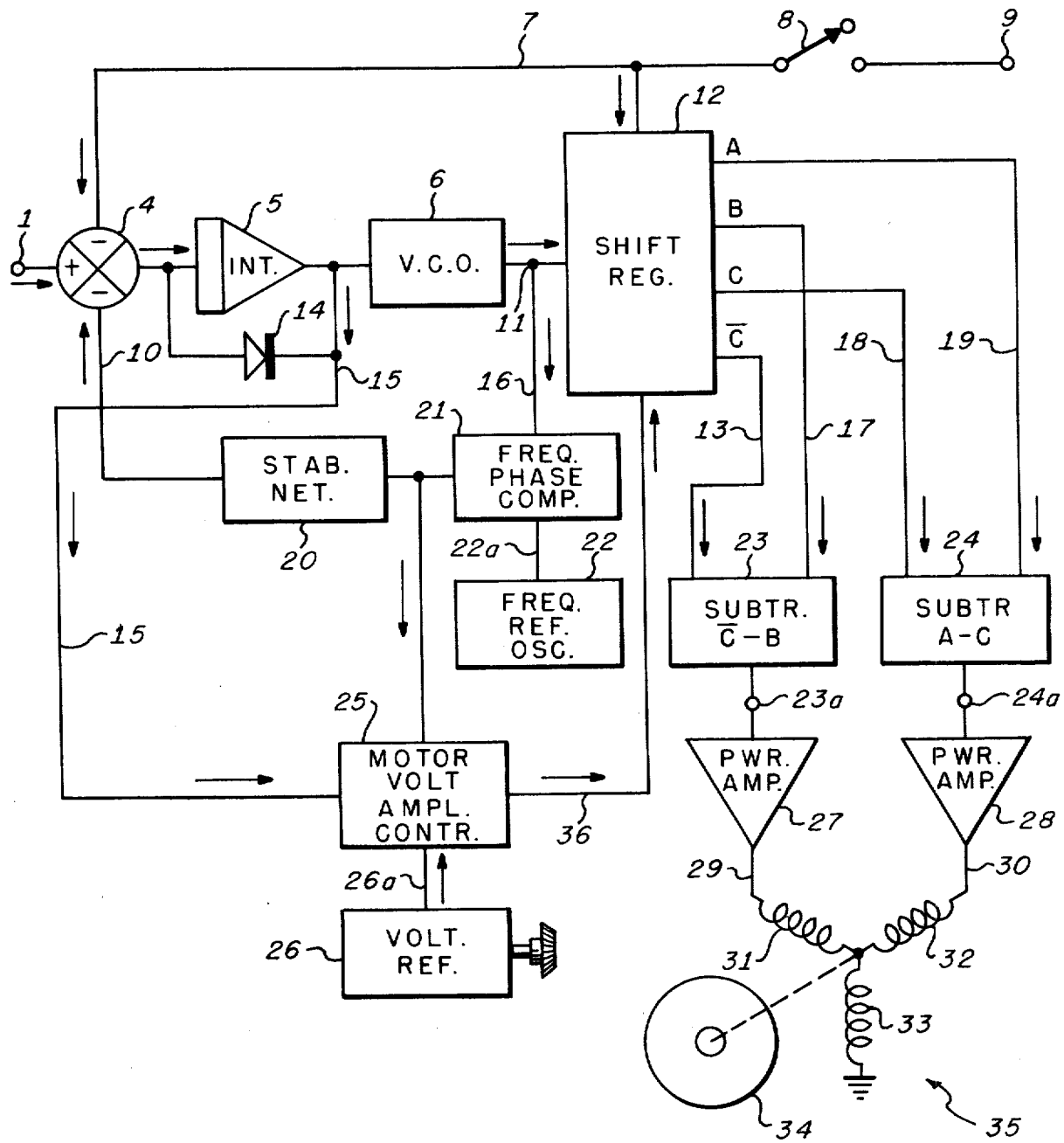
FIG. 1 is a wiring diagram of the gyroscope rotor synchronous drive system, showing its electrical components and their electrical interconnections.
Figure 6:
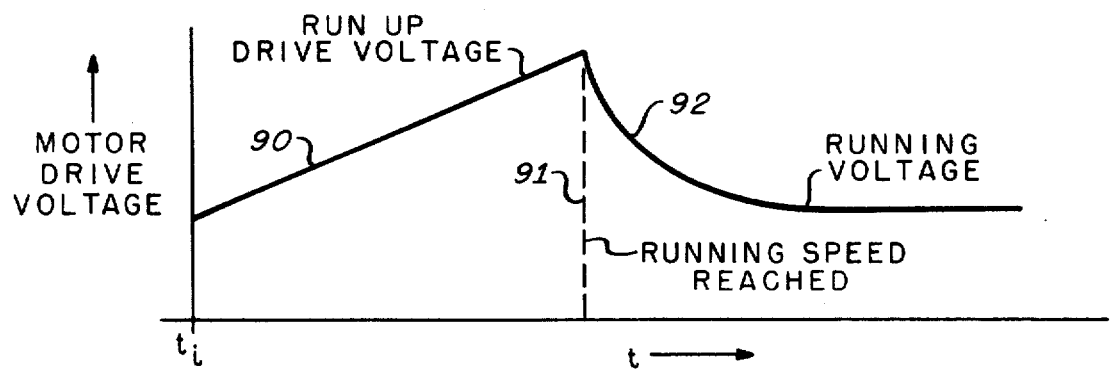
FIG. 6 is a graph useful in explaining the operation of the invention.

The electrical rotor-driving circuit of the present invention may be used in many applications of synchronous and induction motors. For example, it is of particular interest for use in precision gyroscopic compasses of the aforementioned kinds in which it is desired to control rotor speed at a predetermined constant value or according to a predetermined cyclically variable or reversing program. As is seen in FIG. 1, apparatus is first of all provided for accelerating the rotor 34 of gyroscope motor 35 up to its synchronous operating speed by the synthesis of two signals at leads 29, 30, each linearly or otherwise increasing in frequency (identified herein as using a frequency ramp) whereas it is often past practice simply to apply fixed frequency, fixed amplitude drive signals to the stator winding of the motor, allowing the rotor eventually to come up to the same speed as that of the rotating magnetic field. In the present invention, the magnetic poles and their locations are established within the rotor ring at the start of the applied frequency ramp and then, by accelerating the rotating field, the rotor ring and the rotor remain locked to the rotating field during rotor run up as illustrated at 90 in FIG. 6.

Referring particularly to FIG. 1, a voltage furnished by a voltage reference source (not shown) coupled to terminal 1 is supplied as an input to a conventional summation device 4 in the polarity shown with respect to a second input signal yet to be discussed and supplied on the second input lead 10. The difference or error signal produced by summation device 4 is coupled to the input of a conventional integrator 5, which has a time constant, for example, of about 26 seconds and produces an integrated version of the error signal in the form of a unidirectional signal normally linearly increasing in magnitude which is supplied by branching leads for two purposes. One application of the sweep or integrated wave is to the conventional voltage controlled oscillator 6, while the other is via lead 15 to the motor voltage amplitude comparator and control 25, yet to be discussed. Voltage controlled oscillator 6 reacts to its input in the usual manner, producing the aforementioned frequency ramp or signal of preferably linearly increasing frequency varying, for example, from 0 to 1,200 Hz. The latter signal is coupled to a conventional shift register 12 of the serial input, parallel output type, as will be further discussed. It will be understood that, before the command to apply power to the rotor is received, integrator 5 is held in a zero input state by an input initial state bias, supplied when switch 8 is closed, via lead 7 from a voltage source (not shown) at terminal 9. This bias attempts to drive the output of integrator 5 negative, but the diode 14 clamps that output at zero. When the gyroscope rotor 34 is to be operated, the integrator (5) bias is removed, and it then starts formation of an upward ramp wave at a rate, for example, of 0.58 volts per second if precisely linear.

The output of the voltage controlled oscillator 6 is also coupled at junction 11 via electrical lead 16 to a conventional edge-triggered frequency phase detector 21, to the second input of which is coupled a stable square wave or pulsed signal generated by frequency reference oscillator 22 of about 1,200 Hz frequency. When there is a difference between the frequencies of the two signals going into phase detector 21, a direct current error signal is passed from phase detector 21 through stabilization networks 20 and via lead 10 to summation device 4. The output of phase comparator 21 is a positive going, triple state, pulse train whose average value will remain at substantially zero for voltage controlled oscillator frequencies of less than the 1,200 Hz reference frequency. The average value jumps to a level of ten volts for voltage controlled oscillator frequencies greater than 1,200 Hz. The average output value varies in a pulsating manner between zero and ten volts for a voltage controlled oscillator frequency of 1,200 Hz, depending upon the relative phases of the square wave or pulsed signals on lead 16 and from frequency reference oscillator 22.

The phase comparator (21) output, as previously noted, is summed into integrator 5 and ultimately stops the ramp formation in the usual manner by balancing the integrator 5 input current when frequency, then phase equality, occurs. A simple series capacitor-resistor lead network forms the stabilizing network 20 in lead 10 for loop stabilization. The oscillations of voltage controlled oscillator 6 are rapidly locked to the reference frequency signal output of frequency reference oscillator 22 in the usual phase locked manner and remain so locked. The use of a phase comparator 21 sensing frequency error as well as phase error provides the loop with the ability to anticipate the frequency lock event and to achieve it with stability.

To provide signals for controlling synchronous motor 35, the output of voltage controlled oscillator 6 is coupled through junction 11 to one input of shift register 12, a second input thereof being derived from the motor voltage amplitude control 25 via lead 36. The signal on lead 36 provides power to the components of shift register 12, as is shown in more detail in FIG. 2, varying so as to change the amount of power directed to motor 35 as a function of speed. Integrator 5 and shift register 12 are initialized via lead 7 when the operator-controlled switch 8 is connected to a voltage source (not shown) at terminal 9. Integrator 5 is then clamped at zero, as previously described, and the shift register (12) outputs are all set at zero.

Figure 2:
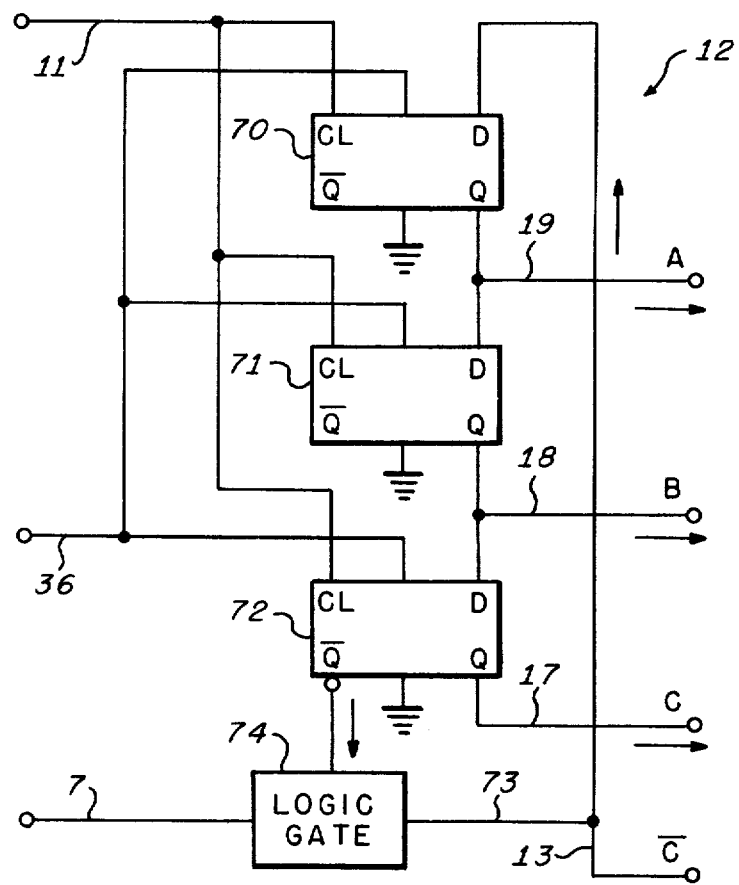
FIG. 2 is an electrical diagram of a shift register circuit component of the apparatus of FIG. 1.
Figure 3:
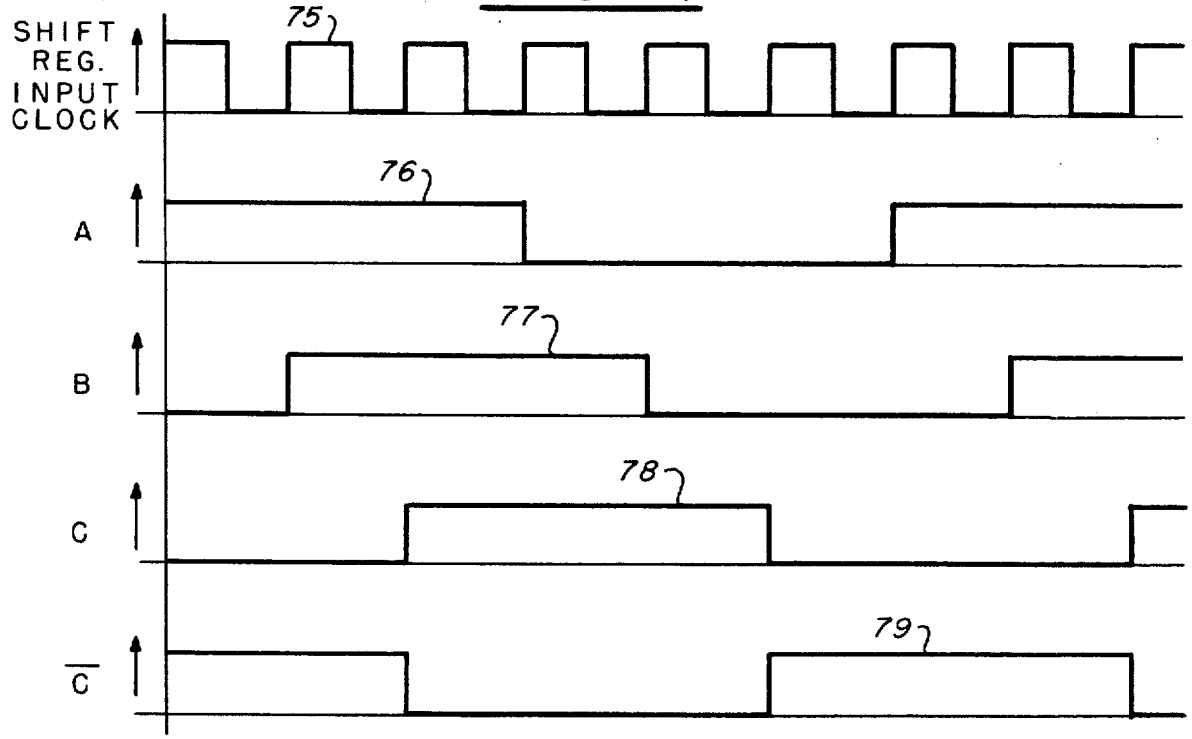
FIGS. 3 and 4 are wave form diagrams useful in explaining the operation of the invention.

The conventional serial input shift register 12 with its three parallel outputs A, B, and C is shown in more detail in FIG. 2 as including an array of three conventional data type bistable circuits or flip-flops 70, 71 and 72. The terminal 11 output clock signal 75 (FIG. 3) of voltage controlled oscillator 6 of FIG. 1 is coupled to each of the clock inputs of bistable units 70, 71 72. The Q output of circuit 70, which is the A signal 76 of FIG. 3, is coupled to the D terminal of circuit 71. The Q output of circuit 71, which is the B signal 77 of FIG. 3, is coupled to the D terminal of circuit 72. The Q output 78 of circuit 72 supplies the desired C signal 78 of FIG. 3. The signals A, B, and C of FIG. 3 are produced because the $\overline{Q}$ output of bistable circuit 72 is coupled by lead 73 to the D terminal of the first bistable circuit 70; this produces a ring counter circuit with four square wave outputs A, B, C that are respectively skewed in phase by 60°. The outputs A, B, C, and $\overline{C}$ can be set to zero by the signal on lead 7 which, through logic gate 74 can hold lead 73 at the zero level.

Figure 4:
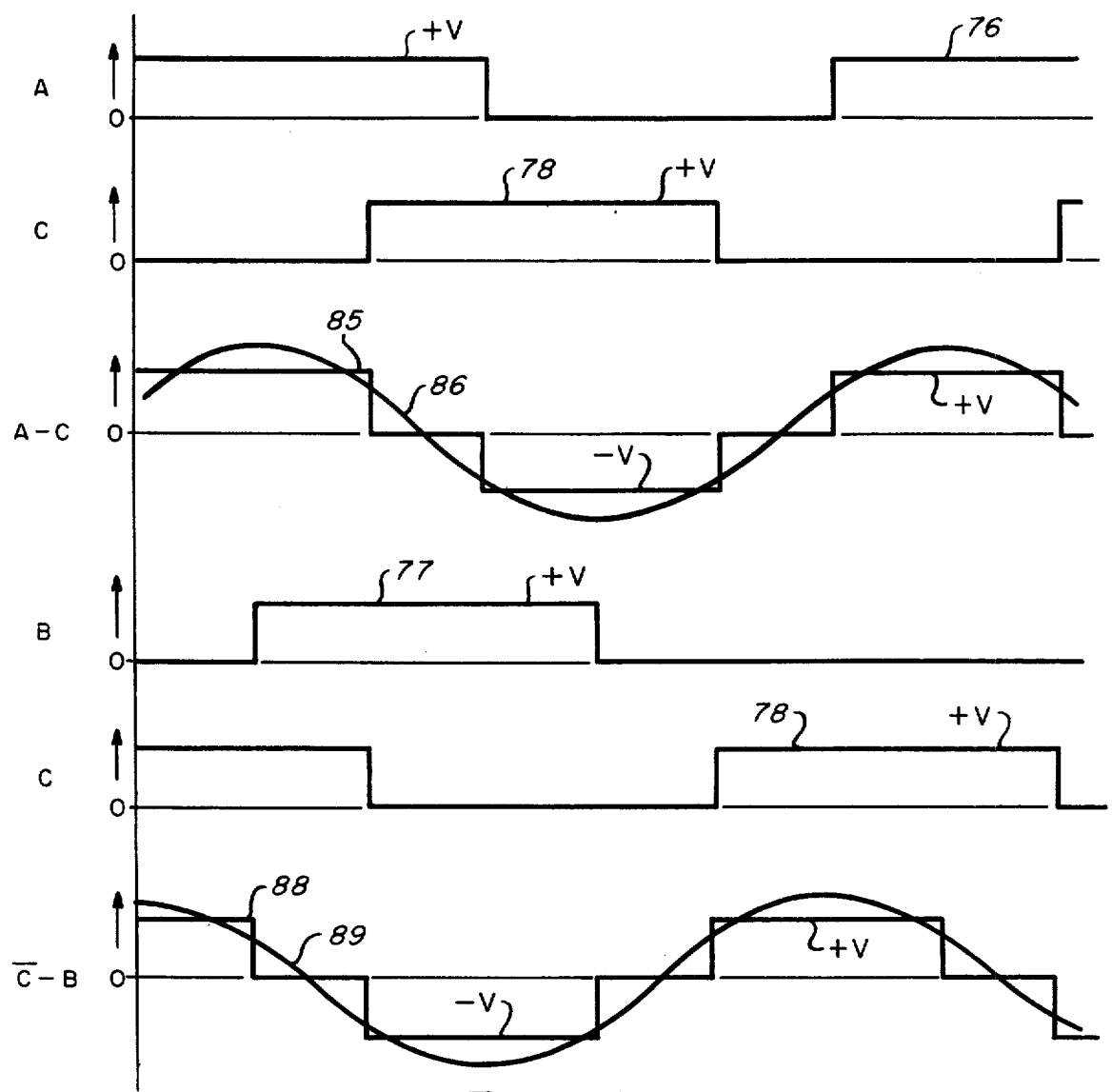

Referring now to FIGS. 1 and 4, the shift register (12) outputs A, B, C, and $\overline{C}$ leads 13, 17, 18 and 19 are processed in a particular manner by subtractor circuits 23, 24 for synthesizing signals simulating a sine wave voltage for driving motor 35. In the upper part of FIG. 4, the respective A and C signals 76 and 78 are shown. The signal C on lead 17 is subtracted from signal A on lead 19 in a conventional subtractor 24 of FIG. 1, which subtraction process strictly yields the multiply-stepped regular wave train 85 of FIG. 4. Likewise, the respective B and $\overline{C}$ signals 77 and 78 are seen in the lower portion of FIG. 4. Signal B on lead 18 of FIG. 1 is subtracted from signal $\overline{C}$ in subtractor 23, which subtraction event yields the second multiply-stepped wave form 88 of FIG. 4 simulating a second sine wave. It will readily be appreciated by those skilled in the art that the multiply-stepped waves 85, 88, are substantially sine waves respectively spaced apart at 60° regardless of the operating frequency. In effect, they are mainly fundamental frequency waves, with only the minor distorting presence of low amplitude fifth and higher harmonics which, for present purposes, may be ignored so that filters are not required. For driving rotor 34 of motor 35 through leads 29, 30, the respective signals 86, 89 are effective in driving the motor after amplification by the respective conventional power amplifiers 27, 28. As is seen in FIG. 1, the output of power amplifier 27 is coupled by lead 29 to stator coil 31, while the output of power amplifier 28 is coupled by lead 30 to stator coil 32, while the outer end of the third stator coil 33 is grounded in an open delta configuration.

The amplitudes of the square wave trains A, B, C, C of FIGS. 3 and 4 as produced by shift register 12 control the amplitudes of the motor drive signals at the outputs of power amplifiers 27, 28. These amplitudes are each determined by the motor voltage amplitude control 25, which control will be further discussed with respect to FIGS. 5 and 6.

Figure 5:
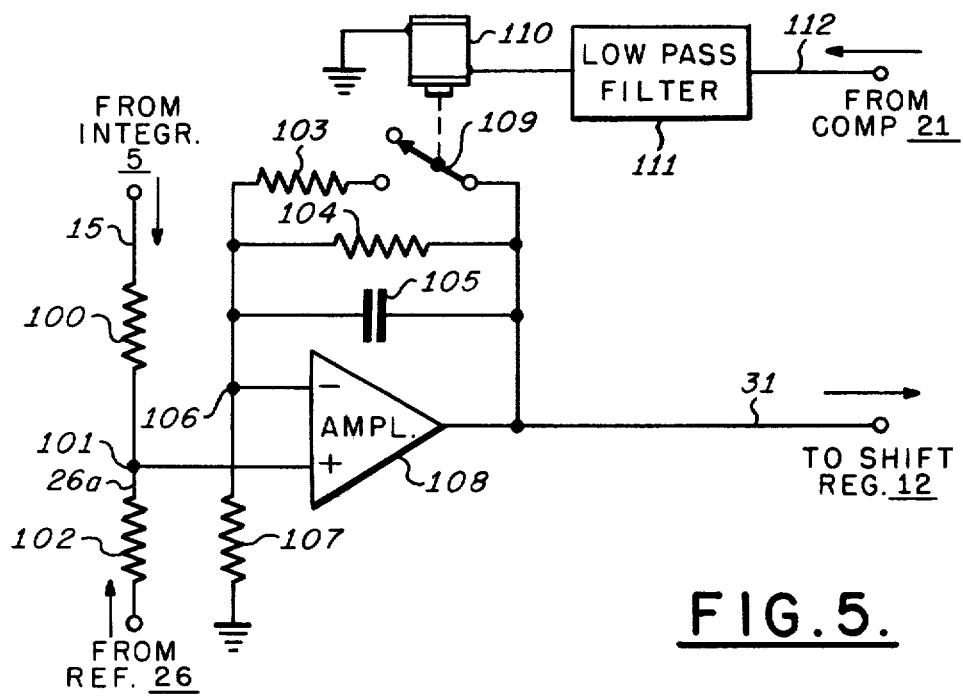
FIG. 5 is a detailed wiring diagram of a component of the FIG. 1 apparatus.

The motor voltage amplitude control 25 of FIG. 5, as previously noted, has three inputs:
  (a) a reference voltage from source 26,
  (b) the output of integrator 5, and
  (c) the output of edge phase comparison circuit 21.
All of these are varying unidirectional voltage levels. The signals from integrator 5 and from reference generator 26 are coupled across the series resistors 100, 102, whose mid-point 101 is coupled to one input of amplifier 108. The second input 106 of amplifier 108 is coupled to ground through resistor 107 and from the amplifier's output by a network including parallel resistors 103 and 104 and capacitor 105. The current path through resistor 103 may be broken after starting by a switch 109 operated, for example, by relay solenoid 110 when activated through low pass filter 111 by signals on lead 112 from phase detector 21.

In operation, the circuit of FIG. 5 has been stabilized at a positive level determined by reference voltage generator 26 before rotor run-up is initiated. This condition and the gain characteristics of amplifier 108 establish the starting voltage applied to the inputs of motor 35. As rotor spinning starts, the ramp output of integrator 5 on lead 15 starts from zero and continues upward positively. This ramp voltage is summed with the reference voltage on lead 26a and results in a gradual increase in the voltage input to motor 35 in proportion to motor speed. When the normal motor running speed is reached, the phase detector (21) output responding to lock the loop, the filtered output of detector 21 and lead 112 is used to cause relay 110 to close the previously opened switch 109, thus reducing the gain of amplifier 108 and consequently reducing its voltage output level fed to power the shift register 12. This event occurs at time 91 in FIG. 6, and decreases the motor drive voltage after run-up in accord with its decreased torque demand. To remove any tendency for motor 35 to hunt, capacitor 105 is included in the amplifier network to cause the motor-driving voltage to decay gradually to the asymptotic running voltage level of curve 92.

FIGS. 7, 8, 9 and 10 illustrate the versatility of the invention by disclosing, by way of example, application of the invention to a conventional representative a.c. motor 156 having windings differing from those of motor 35. In fact, these figures are dedicated to the use of the invention with a conventional two-phase motor 156 of the kind often used to drive the rotor of a strapped-down flexible rotor gyroscope.

Figure 7:
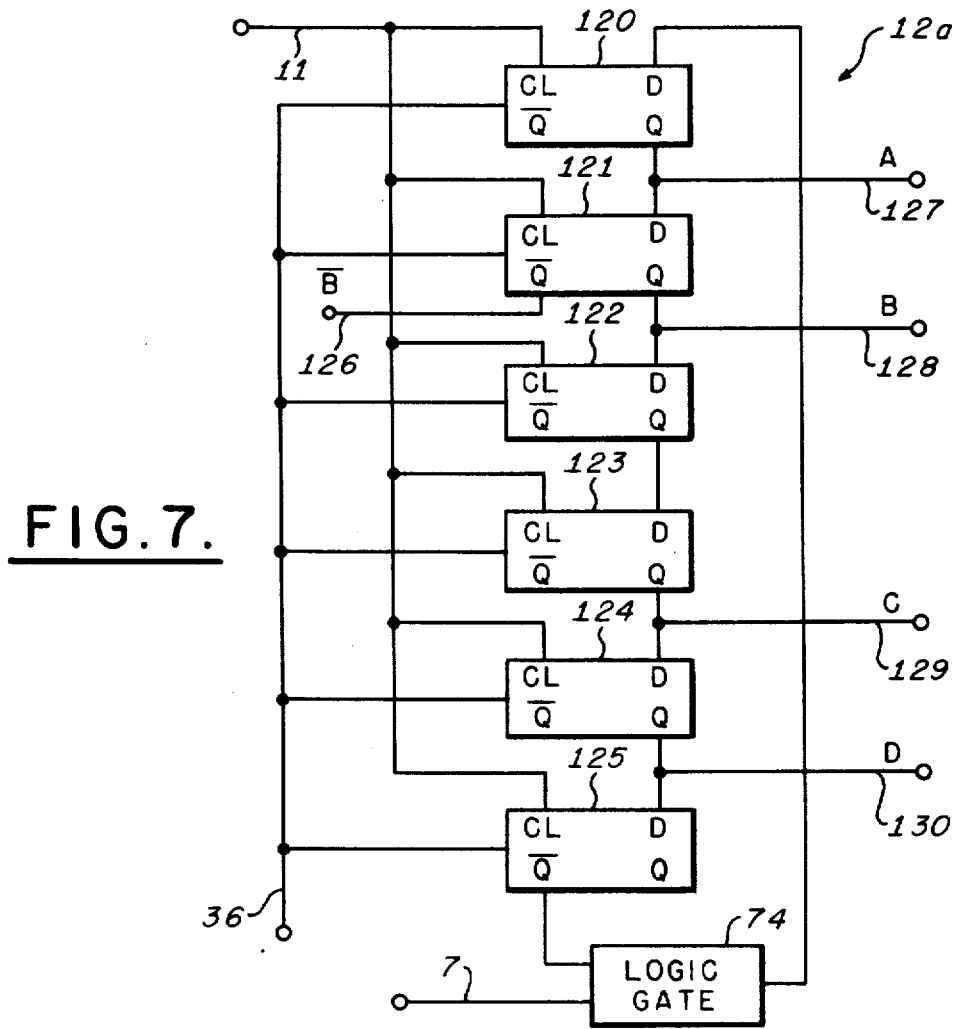
FIG. 7 is an electrical wiring diagram of an alternative shift register system.

For this purpose, the shift register 12 of FIG. 1 is replaced by the more complex shift register 12a of FIG. 7 which also employs as inputs the voltage controlled oscillator signal of junction 11 and the power level control signal on lead 36 from motor control 25. Shift register 12a includes an array of six conventional data type flip-flops 120 through 125. The lead 11 signal is again coupled to each of the clock inputs of bistable units 120 through 125. The Q output of bistable unit 120 is coupled to the D terminal of circuit 121 and provides the A output of the register. Similar connections are made between successive bistable units down to unit 124 whose Q output is coupled to the D terminal of unit 125. The respective A, B, C and D outputs of shift register 12a are found on the first, second, fourth, and fifth of these connections. The $\overline{Q}$ output of bistable circuit 125 is coupled back to the D terminal of the first bistable circuit 120 producing ring counter operation. Also required is the $\overline{B}$ output derived from the $\overline{Q}$ output of bistable stage 121. These outputs are illustrated in FIG. 8 as the respective wave trains 140 through 144, wave 75 again being the clock terminal input from voltage controlled oscillator 6.

Figure 8:
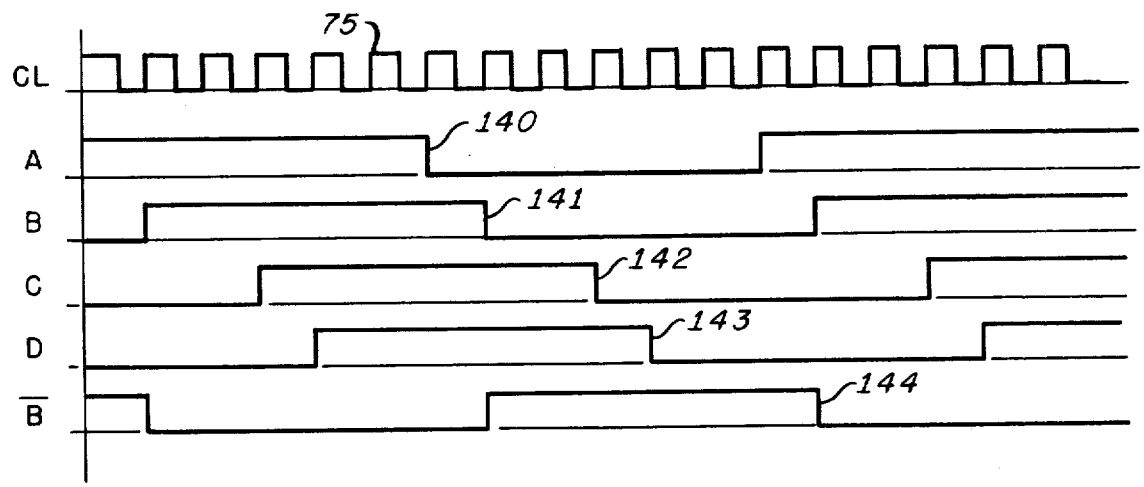
FIGS. 8 and 9 are wave form diagrams useful in explaining the operation of a form of the invention using the shift register of FIG. 7.
Figure 9:
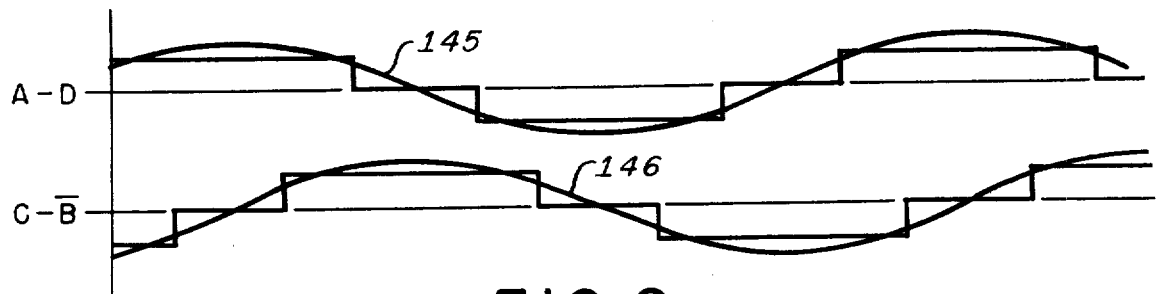
Figure 10:
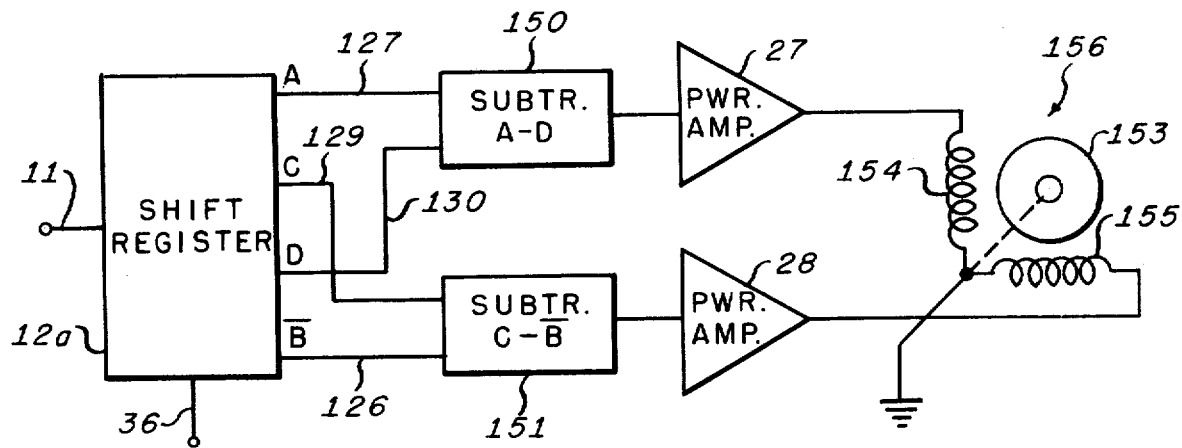
FIG. 10 is an alternative to a part of the apparatus of FIG. 1 when using the shift register of FIG. 7.

In a manner generally analogous to the operation illustrated in FIGS. 3 and 4, the several shift register outputs of FIG. 8 are processed in a further particular manner by subtractor circuits 150, 151 of FIG. 10 for synthesizing the signals 145, 146 of FIG. 9 for driving the rotor 153 of motor 156. Signal D on lead 130 is subtracted in subtractor 150 from the signal A of lead 127, yielding the stepped wave train 145 of FIG. 9. Similarly, the signal $\overline{B}$ on lead 126 is subtracted from the signal C on lead 129 in subtractor 151, yielding the wave train 146 of FIG. 9. These substantially sine waves are spaced apart in phase by 90° regardless of the operating frequency and contain only minor energy in higher harmonic form whose presence may be ignored. The respective signals at the outputs of subtractors 150, 151 are amplified by power amplifiers 27, 28 and are coupled as shown to the two-phase winding comprising coils 154, 155 of motor 156 to drive rotor 153 in the usual manner. It will be apparent to those skilled in the art that motors of winding types aside from those discussed in connection with FIGS. 1 and 10 may be driven according to the principles of the present invention by simple modification of the FIG. 4 or FIG. 9 wave trains.

Figure 11:
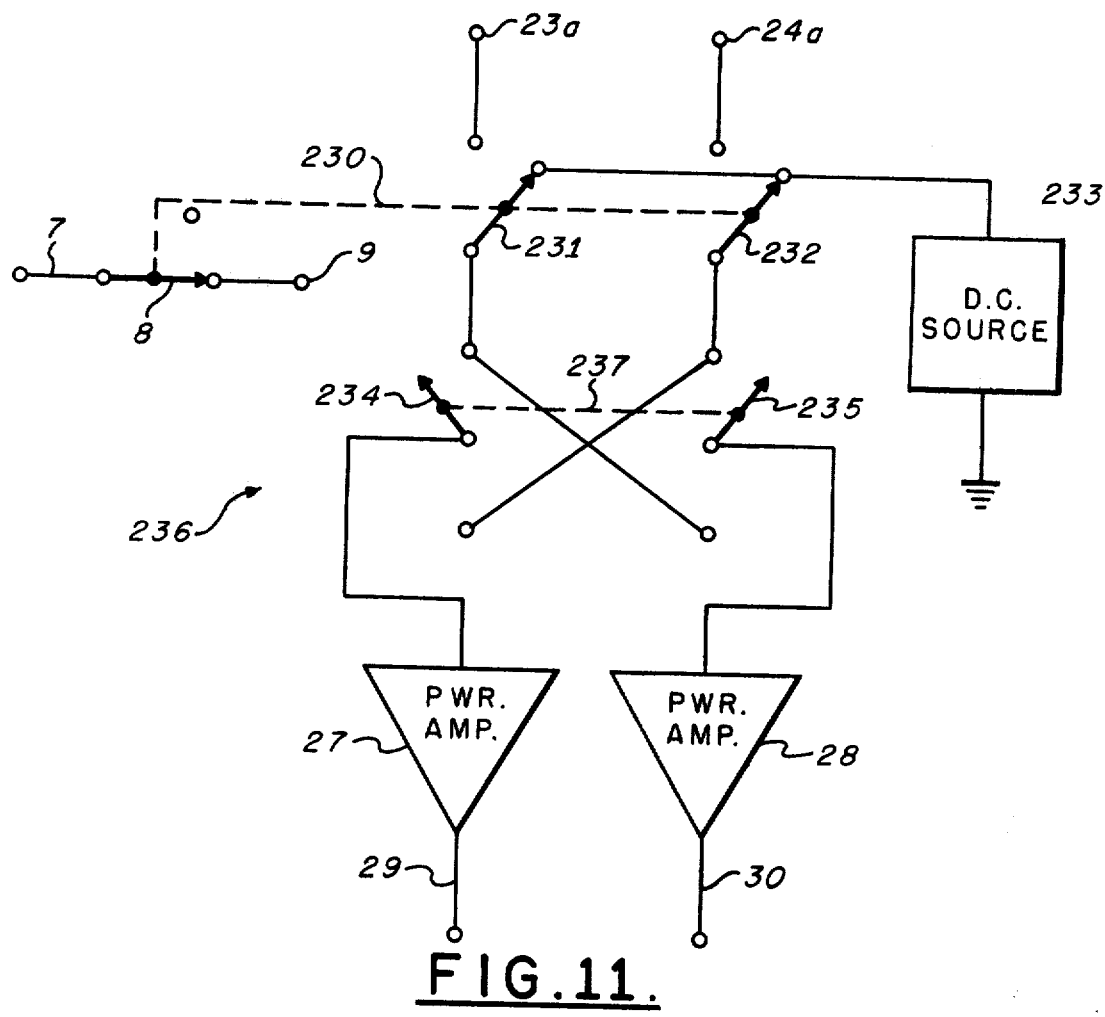
FIGS. 11 and 12 illustrate switching arrangements extending the utility of the invention.
Figure 12:
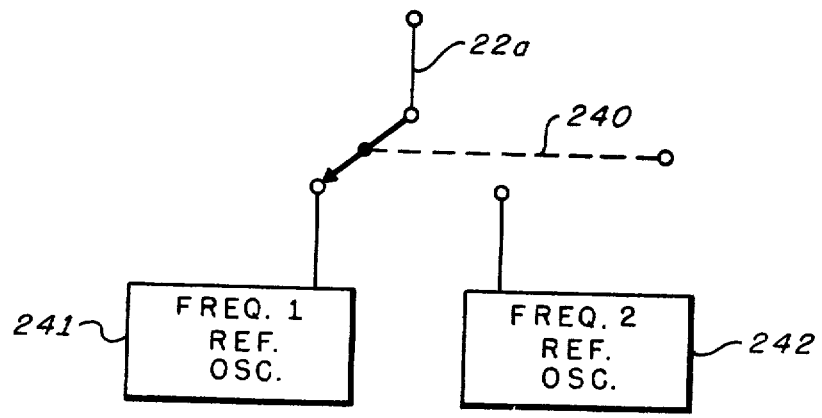

It will further be understood that the invention has wide versatility and may be employed in a variety of applications, such as in gyro H modulation and H reversal situations. Braking of a spinning rotor for such purposes may readily be accomplished by coupling the switching circuit of FIG. 11 between terminals 23a, 24a of FIG. 1 and motor input leads 29, 30. In the running condition, the initial state switch 8 in lead 7 of FIG. 1 is open, and switches 231, 232 are closed via the gang connecting mechanical or other link 230. Switches 234, 235 are closed in one direction. To brake rotor 34, switches 231, 232 are moved to the right in the drawing and current from d.c. source 233 flows through coils 31, 32 and then coil 33 to ground, rapidly stopping rotor 34. Upon closure of switches 231, 232 with respect to source 233, or at any time during the braking cycle, switch 8 may be closed to place integrator 5 and shift register 12 in their initial states. When switches 231, 232 are returned to contact the leads of the respective terminals 23a, 24a, the initial state biases are removed. Finally, when reversal of rotor 34 is to be attained, a reversing switch 236 may be inserted in the circuit, as shown in FIG. 11, having switch elements 234, 235 operated by mechanical or other link 237. It will be understood that the several switches 8, 231, 232, 234, 235 are shown as mechanical manually operated switches merely as a matter of convenience, since electronically controlled semiconductor or other electronic switches would normally be employed. Clearly, the operation of such switches is readily controlled by a conventional computer or by other conventional switch programming devices. Similar control for H modulation may be exercised as shown in FIG. 12 by substituting two frequency reference oscillators 22a, 22b for the single frequency reference oscillator 22 of FIG. 1. In this manner, the rotor (34) rotation rate may be cyclically controlled between two predetermined frequencies according to the operation of the conventional programmed linkage 240.

Accordingly, it is seen that the invention overcomes defects and deficiencies of the prior art by providing stable synchronous systems for starting and running precision gyroscope spin motors. Run-up energy and operating power is saved by reliably establishing magnetic polarization of the rotor ring prior to start-up and then increasing the stator magnetic field to its normal rotation speed. The initial polarization of the rotor ring is reliably retained as the rotor follows the stator magnetic field. Furthermore, the invention features minimum source or battery drain, satisfying the need for a high efficiency battery operated synchronous motor drive. The invention is flexible in nature, being readily adaptable to the control of motors having various types of multi-phase windings and being readily adaptable to use in various types of inertial reference gyroscopes, including gyrocompasses requiring rotor speed variation or reversal.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Control apparatus for operating synchronous motor means of the kind having a normal inherent synchronous rotation speed, said control means comprising:

summation means having output means and first and second input means,
said first input means being adapted to receive a first signal of predetermined amplitude,
integrator means responsive to said output means,
voltage-controlled oscillator means responsive to said integrator means,
stable frequency reference means,
edge-triggered frequency-phase detector means responsive to said voltage-controlled oscillator means and to said stable frequency reference means for generating an error signal coupled to said second input means,
voltage amplitude control means responsive to said edge-triggered frequency-phase detector means and to said integrator means,
pulse generator means responsive to said voltage controlled oscillator means and to said voltage amplitude control means for generating a plurality of phase displaced pulse trains, and
combining means for combining in a predetermined manner pairs of said plurality of phase displaced pulse trains,
said synchronous motor means being responsive to said combining means.

2. Apparatus as described in claim 1 wherein said voltage amplitude control means is additionally responsive to stable reference voltage means.

3. Apparatus as described in claim 2 wherein said voltage amplitude control means includes amplifier means having means for decreasing the gain of said amplifier at a predetermined value of the output of said edge-triggered frequency-phase detector means.

4. Apparatus as described in claim 1 further including stabilizing network means coupled in series between said edge-triggered frequency-phase detector means and said second input means.

5. Apparatus as described in claim 1 wherein said pulse generator means comprises shift register means producing first, second, third, and fourth phase displaced pulse trains.

6. Apparatus as described in claim 1 wherein said combining means comprises:
first subtractor means responsive to said first and third phase-displaced pulse trains for synthesizing a first voltage wave simulating a first sine wave, and
second subtractor means responsive to said second and fourth phase-displaced pulse trains for synthesizing a second voltage wave simulating a second sine wave phase-displaced with respect to said first sine wave.

7. Apparatus as described in claim 6 further including means for coupling amplified versions of said respective first and second voltage waves to at least two of the stator coils of said synchronous motor means.

8. Apparatus as described in claim 7 wherein said shift register means and said first and second subtractor means are so constituted and so arranged that the phase displacement between said first and second voltage waves is 60°.

9. Apparatus as described in claim 7 wherein said shift register means and said first and second subtractor means are so constituted and so arranged that the phase displacement between said first and second voltages is 90°.

* * * * *